(12) United States Patent
Gareis et al.

(10) Patent No.: US 6,816,919 B2
(45) Date of Patent: Nov. 9, 2004

(54) METHOD AND SYSTEM FOR CONFIGURING INPUT/OUTPUT POINTS

(75) Inventors: Ronald E. Gareis, Charlottesville, VA (US); Edwin M. Thurnau, McGaheysville, VA (US); Derald Herinckx, Charlottesville, VA (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 126 days.

(21) Appl. No.: 09/682,060

(22) Filed: Jul. 16, 2001

(65) Prior Publication Data

US 2003/0014573 A1 Jan. 16, 2003

(51) Int. Cl.[7] .............................................. G06F 3/00
(52) U.S. Cl. .............................. 710/14; 710/12; 710/8; 326/41; 439/638
(58) Field of Search ........................... 710/8, 104, 12, 710/14, 62, 65, 72; 326/41; 439/638

(56) References Cited

U.S. PATENT DOCUMENTS

| 4,593,380 A | 6/1986 | Kocher et al. |
|---|---|---|
| 4,628,397 A | 12/1986 | Gareis et al. |
| 4,764,868 A | 8/1988 | Ketelhut et al. |
| 4,814,982 A | 3/1989 | Weir |
| 4,952,934 A * | 8/1990 | Chiriatti ..................... 341/142 |
| 5,530,810 A | 6/1996 | Bowman |
| 5,659,680 A | 8/1997 | Cunningham et al. |
| 6,014,319 A | 1/2000 | Kuchta et al. |
| 6,058,019 A | 5/2000 | Graves et al. |
| 6,091,609 A | 7/2000 | Hutson et al. |
| 6,222,708 B1 | 4/2001 | Severson et al. |
| 6,509,758 B2 * | 1/2003 | Piasecki et al. ............... 326/37 |
| 2002/0119706 A1 * | 8/2002 | Sagues et al. .............. 439/638 |

FOREIGN PATENT DOCUMENTS

EP          0 639 916 A2 *  2/1995

* cited by examiner

*Primary Examiner*—Kim Huynh
(74) *Attorney, Agent, or Firm*—Eugene K. Hyun, Esq.; Armstrong Teasdale LLP

(57) ABSTRACT

A control circuit for configuring at least one I/O module connector pin is provided. The circuit includes at least one port controlling a configuration of the at least one pin.

41 Claims, 3 Drawing Sheets

METHOD AND SYSTEM FOR CONFIGURING INPUT/OUTPUT POINTS

BACKGROUND OF INVENTION

This invention relates generally to input/output modules, and more particularly to a method and system of configuring input/output points in an input/output module.

Input/output (I/O) modules are utilized to connect a device, such as a programmable logic controller (PLC) to a machine interface such that the PLC can control the machine. Typically, when users install I/O modules, they individually wire each point that is being controlled to the specific I/O point. There is a cost associated with handling this wiring and the wiring creates multiple opportunities for errors, and increases overall installation costs. Since each point in the module is individually wired, to connect the I/O module to the machine interface, a cable customized to the specifically wired I/O module is utilized. Therefore, to connect different machine interfaces to the same I/O module, multiple customized connector cables are utilized. These custom cables are an added expense of operating the machines and since multiple cables are utilized for multiple machines, the cables can be lost or damaged when not is use.

SUMMARY OF INVENTION

In one aspect, a control circuit is provided for configuring at least one I/O module connector pin. The circuit comprises at least one port controlling a configuration of the at least one pin.

In another aspect, an I/O module is provided comprising at least one connector pin and a control circuit comprising a plurality of switches. The switches control a configuration of the at least one pin.

In another aspect, a PLC is provided comprising a CPU and an I/O module. The I/O module comprising at least one connector pin and a control circuit. The control circuit comprising a plurality of ports. A configuration of the at least one connector pin is determined by an energization state of said ports.

In a further aspect, a method is provided for configuring at least one connector pin utilizing a control circuit. The control circuit including at least one port. The method comprising providing an energization state to the at least one port and controlling a configuration of the at least one connector pin utilizing the energization state of the at least one port.

DETAILED DESCRIPTION

In one embodiment, a connector system for an I/O module is provided including a circuit that supports configuring at least one point on an I/O module to any one of a discrete input or output, an analog input or output, power, and ground, by controlling a position of multiple switches as described below in detail. The system enables a customer to utilize a standard cable to connect the I/O module to multiple machine interfaces even if the machine interfaces include different pin configurations. More particularly, and in one embodiment, each pin of an I/O module I/O connector is configurable to enable the I/O module requirements to match the machine interface requirements. In addition, at least one pin in the I/O connector is configurable to discrete input or output, analog input or output, power, and ground.

Figure 1:
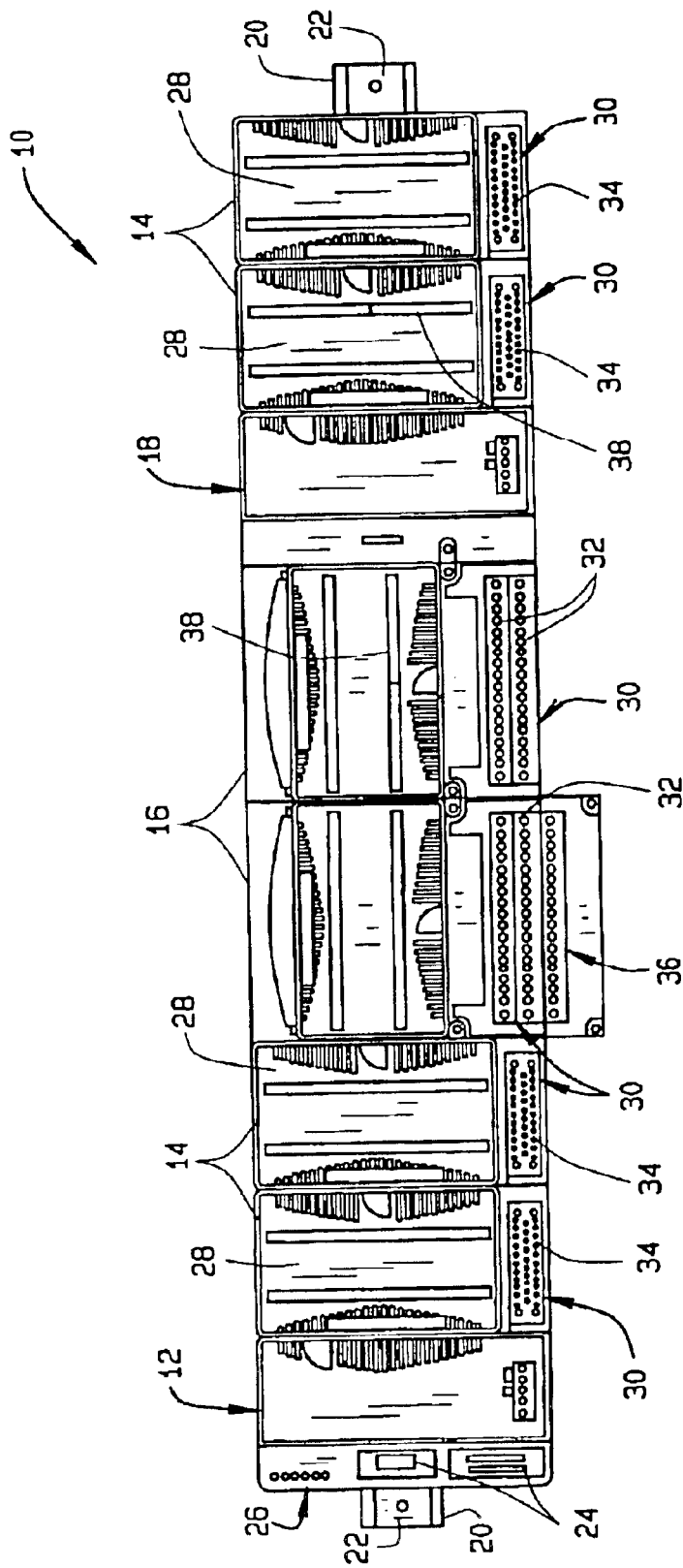
FIG. 1 is a top plan view of a modular programmable logic controller including a plurality of input/output module carriers.

FIG. 1 is a top plan view of a modular programmable logic controller 10 including a CPU 12 connected to a plurality of connector type I/O module carriers 14, a plurality of I/O terminal type carriers 16, and a power booster 18 installed on a section of 7.5 mm×35 mm DIN rail 20 which is electrically grounded and has a conductive, corrosion resistant surface 22. DIN rail 20 may be mounted on a panel (not shown) for vibration resistance, and I/O module carriers 14, 16 may further be mounted on the panel for maximum resistance to mechanical vibration and shock.

CPU 12 includes serial ports 24 for interfacing and networking with external computers and controls (not shown), and a plurality of LEDs 26 for indicating operational characteristics of CPU 12. Power for module operation is supplied by a power supply (not shown) mounted directly to CPU 12. Power booster 18 may be supplied if necessary for a selected application, but in many cases is not required. While six I/O module carriers 14, 16 and I/O modules 28 are connected to CPU 12 as shown, it is noted that CPU 12 may operate as a system controller for more or less I/O module carriers 14,16 and different I/O module 28 combinations demanded for a given application. Also other accessories and components beyond that shown and described may be used in a given application within the scope of the present invention. For example a VERSAMAX system CPU may operate as a system controller for up to eight I/O module carriers and I/O modules providing up to 256 local I/O points, and supports a range of components and accessories offered by GE Fanuc Automation Corporation of Charlottesville, Va.

Each of module carriers 14, 16 interfaces with a replaceable I/O module 28 adapted for a particular purpose, and each I/O module carrier 14, 16 includes a plurality of terminal connections 30 adjacent respective I/O modules 28. Terminal type module carriers 16 include screw terminals 32 for connection to I/O devices (not shown), and connector type module carriers 14 include pin connectors 34 for attachment of an I/O cable (not shown) further attached to interposing terminals (not shown) with terminal connections for connection to I/O devices. Additional terminal connections may be provided for extra wiring connections for I/O devices, for example, with an auxiliary terminal strip 36 connected to one of terminal type carriers 16.

Figure 2:
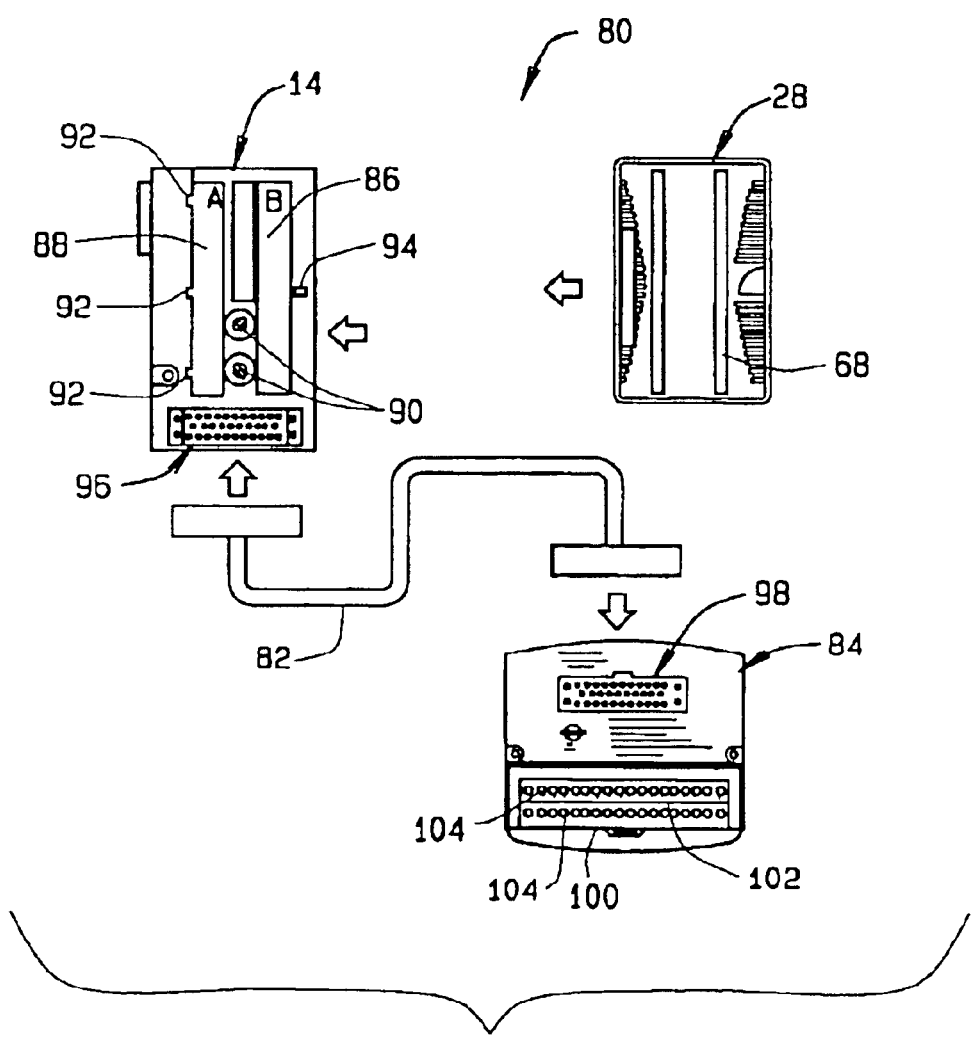
FIG. 2 is an exploded view of a portion of the controller shown in FIG. 1.

FIG. 2 is an exploded view of a connector type I/O module assembly 80 including a connector type I/O module carrier 14, an I/O module 28, an I/O cable 82 and an interposing terminal block 84. Connector type I/O module carrier 14 includes a primary socket connection 86 and a secondary socket connection 88 adapted to receive pin connections (not shown) of I/O module 28. Keying dials 90 on I/O module carrier 14 are used to ensure that a correct module type is installed on I/O module carrier 14 by manipulating each dial 90 to match a factory keyed setting found on an underside (not shown) of I/O module, for example, a number and a letter corresponding to each dial. T-shaped key slots 92 are located adjacent secondary connection socket 88 to receive complementary projections (not shown) on the underside of I/O module 28 and ensure that the I/O module pin connections are inserted in a straight or level fashion into primary 86 and secondary 88 connection sockets, respectively. A latch 94 is positioned adjacent primary connection socket 86 to secure connection of I/O module carrier 14 and I/O module 28.

Each of primary 86 and secondary 88 connection sockets, respectively, include connections designed for 16 I/O points, for a total of 32 I/O points A first pin socket connector 96 is located adjacent primary 86 and secondary 88 connection sockets for an interfacing I/O cable 82 that connects to a second pin socket connector 98 on interposing terminal block 84. A primary terminal strip 100 and secondary terminal strip 102 are positioned below second pin socket connector 98 on interposing terminal block 84 for landing I/O point connections to I/O devices (not shown). Primary terminal strip 100 is electrically associated with primary connection socket 86, and secondary terminal strip 102 is electrically associated with secondary connection socket 88. Each terminal strip 100, 102 includes eighteen screw terminals 104, sixteen screw terminals for connection to sixteen I/O points and two common/power screw terminals.

I/O module 28 is designed to accommodate 16 I/O points, rather than the typical 32 I/O points, to reduce circuit density, reduce power dissipation, and lower cost. Thus, only a portion of I/O module carrier I/O points are actually used by I/O module 28. Consequently, unused I/O points in I/O module carrier 14, and the associated terminal connections on first 96 and second 98 pin socket connectors, which, in turn, connect to interposing terminal block terminal strips 100,102 via I/O cable 82, are open-circuited. Therefore, only the terminals associated with I/O points in I/O module carrier 14 that are actually used by I/O module 28 and connected to terminal strips 100, 102 via I/O cable 82 may be used for wiring connections. Consequently, one or more auxiliary terminal strips 36 (shown in FIG. 1) are ordinarily required for attachment to interposing terminal block 84 for landing ground wires from I/O devices.

While FIG. 2 illustrates a specific embodiment of I/O module carrier assemblies, it is contemplated that other types of I/O module carriers and I/O modules, such as those offered by GE Fanuc Automation Corporation of Charlottesville, Va. could be used in conjunction with the present invention.

Figure 3:
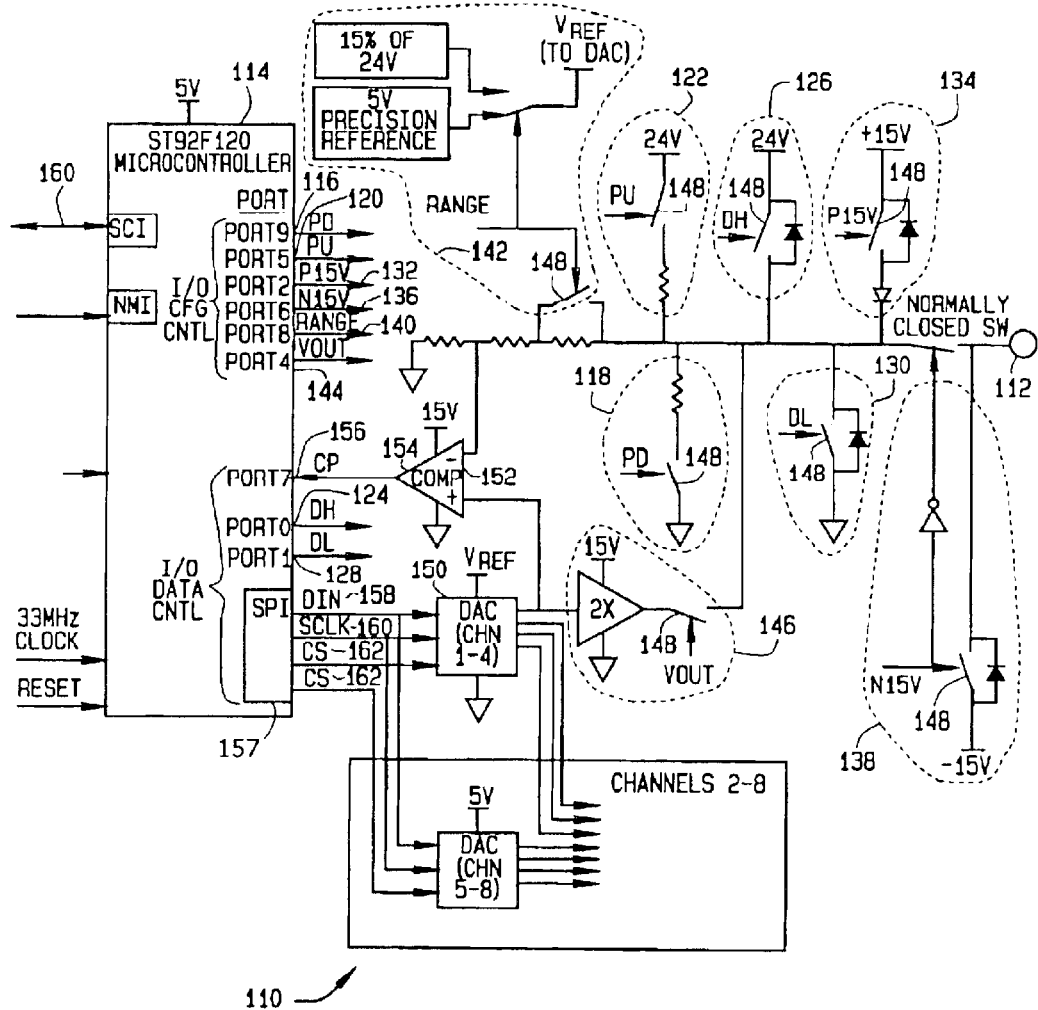
FIG. 3 is a block diagram of a circuit according to one embodiment of the invention.

FIG. 3 is a block diagram of a circuit 110 according to one embodiment of the invention. Circuit 110 includes a pin 112 and circuit 110 is configurable such that pin 112 can perform a variety of functions as explained below. A PLC (not shown) typically has four pins that are connectable to a user's device. Utilizing circuit 110 for each of the four pins enables each pin to perform a variety of functions such that a standard cable can interface the PLC to the user's device.

Circuit 110 includes a microcontroller 114 including a Pull-Down (PD) port 116 controlling a Pull-Down switch assembly 118 of circuit 110, and a Pull-Up (UP) port 120 F controlling a Pull-Up switch assembly 122 of circuit 110. A Discrete High (DH) port 124 controls a Discrete High switch assembly 126, and a Discrete Low (DL) port 128 controls a Discrete Low switch assembly 130 of circuit 110. A positive 15 volt (P15V) port 132 controls a positive 15 volt switch assembly 134, and a negative 15 volt (N15V) port 136 controls a negative 15 volt switch assembly 138 of circuit 110. A range (RANGE) port 140 controls a range switch assembly 142, and a voltage Out (VOUT) port 144 controls a voltage out switch assembly 146 of circuit 110. More specifically, each switch assembly 118, 122, 126, 130, 134, 138, 142, and 146 includes a switch 148, and each port 116, 120, 124, 128, 132, 136, 140 and 144 controls a respective switch 148. Circuit 110 also includes a four-channel eight-bit digital to analog converter (DAC) 150, and a comparator 152. An output 154 of comparator 152 is connected to a comparator port (CP) 156 of microcontroller 114. Microcontroller 114 also includes a Serial Peripheral Interface (SPI) 157 having pins for data in (DIN) 158, serial clock (SCLCK) 160, and two chip selects (CS) 162. As used herein, the term microcontroller is not limited to just those integrated circuits referred to in the art as microcontrollers, but broadly refers to microcontrollers, processors, computers, microcomputers, application specific integrated circuits, and other programmable circuits.

In use, circuit 110 is configurable such that pin 112 can be used in various modes, such as, for example, but not limited to, a high impedance mode, a 24 volt positive logic discrete input mode, a 24 volt negative logic discrete input mode, a 24 volt high side discrete output mode without open wire detection, a 24 volt high side discrete output mode with open wire detection, a 24 volt supply mode, a zero volt low side discrete output mode with out open wire detection, a 24 volt supply mode, a zero volt low side discrete output mode with open wire detection, a ground mode, a zero to ten volt analog input mode, a zero to 10 volt output mode, +15 volt supply mode, and a −15 volt supply mode. In one embodiment, software performing the following functionality is utilized to configure the I/O connector pins. In addition, a switch state of the circuit switches controls the pin to be a discrete input or output, an analog input or output, a power , and a ground.

To enable the high impedance mode, PD 116, PU 120, P15V 132, N15V 136, RANGE 140, VOUT 144, DH 124, and DL 128 are set to zero, that is the respective switches 148 are open. SPI 158 commands DAC 150 to operate at mid-scale output, and microcontroller 114 detects a presence or an absence of back biased power at pin 112 via CP 156. If CP 156 is one then there is an absence of back biased power at pin 112. If CP 156 is zero then there is a presence of back biased power at pin 112 and microcontroller 114 transmits a back biased power present fault message to an input/output (I/O) bus 160.

To enable the 24 volt positive logic discrete input mode, PU 120, P15V 132, N15V 136, RANGE 140, VOUT 144, DH 124, and DL 128 are set to zero. PD 116 is set to 1, that is switch 148 of PD switch assembly 118 is closed. SPI 158 commands DAC 150 to operate at mid-scale output, and microcontroller 114 detects input data via CP 156. CP 156 is read utilizing an input filtering, and if CP 156 is one then the discrete input data is zero. If CP 156 is zero then the discrete input data is 1. Subsequent readings of CP 156 produces a stream of discrete input data which microcontroller 114 transmits to I/O bus 160.

To enable the 24 volt negative logic discrete input mode, PD 116, P15V 132, N15V 136, RANGE 140, VOUT 144, DH 124, and DL 128 are set to zero. PU 120 is set to 1, that is switch 148 of PU switch assembly 122 is closed. SPI 158 commands DAC 150 to operate at mid-scale output, and microcontroller 114 detects input data via CP 156. CP 156 is read utilizing an input filtering, and if CP 156 is one then the discrete input data is 1. If CP 156 is zero then the discrete input data is zero. Subsequent readings of CP 156 produces a stream of discrete input data which microcontroller 114 transmits to I/O bus 160.

To enable the 24 volt high side discrete output mode without open wire detection, PD 116, PU 120, P15V 132, N15V 136, RANGE 140, VOUT 144, and DL 128 are set to zero. DH 124 is set to X, which means not controlled. SPI 158 commands DAC 150 to operate at mid-scale output, and microcontroller 114 receives an output data value (either zero or one) from I/O bus 160. Microcontroller 114 sets DH 124 equal to the received data value and reads CP 156. If DH 124 is one and CP 156 is one then microcontroller 114 waits a predetermined amount of time and reads CP 156 a second time. In one embodiment, the wait time is approximately 100 microseconds. If CP 156 is one on the second reading then microcontroller 114 sets DH 124 to zero and transmits a short circuit or failed switch fault message to I/O bus 160. In one embodiment, microcontroller 114 then idles and waits for user intervention. If CP 156 is zero on the second reading then microcontroller 114 receives a second output data value and sets DH 24 to the second value repeating the above described process.

To enable the 24 volt high side discrete output mode with open wire detection, PD 116, P15V 132, N15V 136, RANGE 140, VOUT 144, and DL 128 are set to zero. PU 120 is set to one and DH 124 is set to X. SPI 158 commands DAC 150 to operate at mid-scale output, and microcontroller 114 receives an output data value (either zero or one) from I/O bus 160. Microcontroller 114 sets DH 124 equal to the received data value and reads CP 156. If DH 124 is one and CP 156 is one then microcontroller 114 waits a predetermined amount of time and reads CP 156 a second time. In one embodiment, the wait time is approximately 100 microseconds. If CP 156 is one on the second reading then microcontroller 114 sets DH 124 to zero and transmits a short circuit or failed switch fault message to I/O bus 160. In one embodiment, microcontroller 114 then idles and waits for user intervention. If, on the first reading, CP 156 is zero and DH 124 is zero then microcontroller 114 waits a predetermined amount of time and CP 156 is read a second time. In one embodiment, the predetermined amount of time is approximately 100 microseconds. If CP 156 is zero on the second reading (following the first reading wherein DH 124 is zero and CP 156 is zero) then microcontroller 114 transmits a open wire fault to I/O bus 160 and receives a second output data value and sets DH 124 to the second value repeating the above described process. If CP 156 is one on the second reading (following the first reading wherein DH 124 is zero and CP 156 is zero) then microcontroller 114 receives a second output data value and sets DH 124 to the second value repeating the above described process.

To enable the 24 volt supply mode, PD 116, PU 120, P15V 132, N15V 136, RANGE 140, VOUT 144, and DL 128 are set to zero, that is the respective switches 148 are open. DH 124 is set to 1. SPI 158 commands DAC 150 to operate at mid-scale output, and microcontroller 114 detects an electrical short circuit via CP 156. If CP 156 is one then microcontroller 114 waits a predetermined amount of time before reading CP 156 a second time. If CP 156 is one on the second reading then there is an electrical short circuit and microcontroller 114 transmits a short circuit fault on I/O bus 160, and, in one embodiment, microcontroller sets DH 124 to zero. If CP 156 is zero then there is no electrical short circuit.

To enable the zero volt low side discrete output mode without open wire detection, PD 116, PU 120, P15V 132, N15V 136, RANGE 140, VOUT 144, and DH 124 are set to zero. DL 128 is set to X, which means not controlled. SPI 158 commands DAC 150 to operate at mid-scale output, and microcontroller 114 receives an output data value (either zero or one) from I/O bus 160. Microcontroller 114 sets DL 128 equal to the received data value and reads CP 156. If DL 128 is one and CP 156 is zero then microcontroller 114 waits a predetermined amount of time and reads CP 156 a second time. In one embodiment, the wait time is approximately 100 microseconds. If CP 156 is zero on the second reading then microcontroller 114 sets DL 128 to zero and transmits a short circuit or failed switch fault message to I/O bus 160. In one embodiment, microcontroller 114 then idles and waits for user intervention. If CP 156 is zero on the second reading then microcontroller 114 receives a second output data value and sets DL 128 to the second value repeating the above described process.

To enable the zero volt low side discrete output mode with open wire detection, PU 120, P15V 132, N15V 136, RANGE 140, VOUT 144, and DH 124 are set to zero. PD 116 is set to one and DL 128 is set to X. SPI 158 commands DAC 150 to operate at mid-scale output, and microcontroller 114 receives an output data value (either zero or 1) from I/O bus 160. Microcontroller 114 sets DL 128 equal to the received data value and reads CP 156. If DL 128 is one and CP 156 is zero then microcontroller 114 waits a predetermined amount of time and reads CP 156 a second time. In one embodiment, the wait time is approximately 100 microseconds. If CP 156 is zero on the second reading then microcontroller 114 sets DL 128 to zero and transmits a short circuit or failed switch fault message to I/O bus 160. In one embodiment, microcontroller 114 then idles and waits for user intervention. If, on the first reading, CP 156 is one and DL 128 is zero then microcontroller 114 waits a predetermined amount of time and CP 156 is read a second time. In one embodiment, the predetermined amount of time is approximately 100 microseconds. If CP 156 is one on the second reading (following the first reading wherein DL 128 is zero and CP 156 is 1) then microcontroller 14 transmits a open wire fault to I/O bus 160 and receives a second output data value and sets DL 128 to the second value repeating the above described process. If CP 156 is zero on the second reading (following the first reading wherein DL 128 is zero and CP 156 is 1) then microcontroller 114 receives a second output data value and sets DL 128 to the second value repeating the above described process.

To enable the ground mode, PD 116, PU 120, P15V 132, N15V 136, RANGE 140, VOUT 144, and DH 124 are set to zero, that is the respective switches 148 are open. DL 128 is set to one, that is the respective switch 148 is closed. SPI 158 commands DAC 150 to operate at mid-scale output, and microcontroller 114 detects a short circuit presence via CP 156. If CP 156 is zero then microcontroller 114 waits a predetermined amount of time and reads CP 156 a second time. If, on the second reading, CP 156 is zero then microcontroller 114 transmits a short circuit fault message to I/O bus 160.

To enable the zero to ten volt analog input mode, PD 116, PU 120, P15V 132, N15V 136, VOUT 144, DH 124, and DL 128 are set to zero. Range 136 is set to one, which means the respective switch 148 is closed. SPI 158 commands DAC 150 through a successive approximation algorithm. Microcontroller 114 utilizes the successive approximation algorithm to determine an analog input voltage. Microcontroller 114 clears a DAC command data value and an N loops counter value. After setting DAC a command bit (11-N) to one, microcontroller 114 transmits a DAC command word to DAC 150. Microcontroller waits a predetermined amount of time, which in one embodiment is ten microseconds, and reads CP 156. If CP 156 is one then DAC command bit (11-N loops) is set to zero. Microcontroller 114 then increments N. When N is 12 then an analog input value is set equal to the DAC command value and microcontroller 114 transmits the analog input value to I/O bus 160. The DAC command data value and the N loops counter value are cleared and a second DAC command may be transmitted to DAC 150 as described above.

To enable the zero to ten volt analog output mode, PD 116, PU 120, P15V 132, N15V 136, DH 124, and DL 128 are set to zero. Range 136 and VOUT 144 are set to one, which means the respective switches 148 is closed. SPI 158 commands DAC 150 to output when desired, and CP 156 is utilized to detect a presence or absence of an electrical short circuit. Microcontroller 114 receives an analog output data from I/O bus 160 and commands DAC 150 to output the received analog output data. Microcontroller 114 waits a predetermined time and then reads CP 156. In one embodiment, the predetermined time is approximately 100 microseconds. If CP 156 is one and the DAC output is greater than a predetermined value then microcontroller waits a predetermined amount of time before reading CP 156 a second time. In one embodiment, the predetermined amount of time is approximately 100 microseconds. If, on the second reading, CP 156 is one then microcontroller 114 commands DAC 150 to zero and transmits an analog output overload or failed output fault message to I/O bus 160. In one embodiment, microcontroller 114 idles and waits for user intervention. When CP 156 is zero, microcontroller 114 receives a second analog output data and outputs as described above.

To enable the +15 volt supply mode, PD 116, PU 120, N15V 136, RANGE 140, VOUT 144, DH 124, and DL 128 are set to zero, that is the respective switches 148 are open. P15V 132 is set to 1. SPI 158 commands DAC 150 to operate at quarterscale output, and microcontroller 114 detects an electrical short circuit via CP 156. If CP 156 is one then microcontroller 114 waits a predetermined amount of time before reading CP 156 a second time. If CP 156 is one on the second reading then there is an electrical short circuit and microcontroller 114 transmits a short circuit fault on I/O bus 160. If CP 156 is zero then there is no electrical short circuit.

To enable the −15 volt supply mode, PD 116, PU 120, P15V 132, RANGE 140, VOUT 144, DH 124, and DL 128 are set to zero, that is the respective switches 148 are open. N15V 136 is set to 1. SPI 158 is set inactive CP 156 is not utilized.

While the invention has been described in terms of various specific embodiments, those skilled in the art will recognize that the invention can be practiced with modification within the spirit and scope of the claims.

What is claimed is:

1. A control circuit for configuring at least one I/O module connector pin, said circuit comprising:
    a processor controlling a configuration of the at least one pin via at least one port, wherein one of said at least one port is configured to be one of a Pull-Down (PD) port, a Pull-Up (PU) port, a Discrete High (DH) port, a Discrete Low (DL) port, a positive 15 volt (P15V) port, a negative 15 volt (N15V) port, a range (RANGE) port, and a voltage out (VOUT) port; and
    a comparator configured to provide an output to a processor located within said circuit, wherein an input of said comparator is coupled to a plurality of switch assemblies including switches and voltage supplies, said switch assemblies configured to operate said at least one pin in one of a plurality of modes.

2. A control circuit in accordance with claim 1 wherein said processor is configured to send a message corresponding to the output via an input/output bus.

3. A control circuit in accordance with claim 2 wherein the message includes one of an absence of a back biased power at said at least one pin and a presence of the back biased power at said at least one pin.

4. A control circuit for configuring at least one I/O module connector pin, said circuit comprising:
    a processor controlling a configuration of the at least one pin via at least one port;
    a plurality of switch assemblies comprising a plurality of solid state switches, said processor controlling whether a respective solid state switch of said solid state switches is in an open state or a closed state; and
    a comparator configured to provide an output to said processor, wherein an input of said comparator is coupled to said switch assemblies including said solid state switches and voltage supplies, said switch assemblies configured to operate said at least one pin in one of a plurality of modes.

5. A control circuit in accordance with claim 4 wherein one of said solid state switches is configured to be one of a Pull-Down switch, a Pull-Up switch, a Discrete High switch, a Discrete Low switch, a positive 15 volt switch, a negative 15 volt switch, a range switch, and a voltage out switch.

6. A control circuit in accordance with claim 4 wherein said processor determines a configuration of one of the switch assemblies.

7. A control circuit in accordance with claim 4 wherein said processor is configured to send a message corresponding to the output via an input/output bus.

8. A control circuit in accordance with claim 7 wherein the message includes one of an absence of a back biased power at said at least one pin and a presence of the back biased power at said at least one pin.

9. An I/O module comprising:
    at least one connector pin;
    a control circuit comprising a plurality of solid state switches, said solid state switches being operated to control a configuration of the at least one pin; and
    a comparator configured to provide an output to a processor located within said circuit, wherein an input of said comparator is coupled to a plurality of switch assemblies including said solid state switches and voltage supplies, said switch assemblies configured to operate said at least one pin in one of a plurality of modes.

10. An I/O module in accordance with claim 9 wherein said processor controls a configuration of a respective at least one switch.

11. An I/O module in accordance with claim 10 wherein said processor controls an energization state of at least one port located within said processor, said processor controlling a state of a respective at least one switch by controlling the energization state of each said at least one port.

12. An I/O module in accordance with claim 10 wherein said processor includes at least one port and one of said at least one port is configured to be one of a Pull-Down (PD) port, a Pull-Up (PU) port, a Discrete High (DH) port, a Discrete Low (DL) port, a positive 15 volt (P15V) port, a negative 15 volt (N15V) port, a range (RANGE) port, and a voltage out (VOUT) port.

13. An I/O module in accordance with claim 9 wherein one of said switches is configured to be one of a Pull-Down switch, a Pull-Up switch, a Discrete High switch, a Discrete Low switch, a positive 15 volt switch, a negative 15 volt switch, a range switch, and a voltage out switch.

14. An I/O module in accordance with claim 9 wherein said processor is configured to send a message corresponding to the output via an input/output bus.

15. An I/O module in accordance with claim 14 wherein the message includes one of an absence of a back biased power at said at least one pin and a presence of the back biased power at said at least one pin.

16. A PLC comprising:
an I/O module comprising at least one connector pin and a control circuit comprising a plurality of ports, a configuration of the at least one connector pin determined by a processor including said ports;
a comparator configured to provide an output to said processor located within said circuit, wherein an input of said comparator is coupled to a plurality of switch assemblies including switches and voltage supplies, said switch assemblies configured to operate said at least one connector pin in one of a plurality of modes; and
a CPU coupled to said I/O module.

17. A PLC in accordance with claim 16 wherein one of said ports is configured to be a Pull-Down (PD) port, a Pull-Up (PU) port, a Discrete High (DH) port, a Discrete Low (DL) port, a positive 15 volt (P15V) port, a negative 15 volt (N15V) port, a range (RANGE) port, and a voltage out (VOUT) port.

18. A PLC in accordance with claim 16 wherein said processor controlling whether one of said switches is in an open state or a closed state.

19. A PLC in accordance with claim 18 wherein one of said switches is configured to be one of a Pull-Down switch, a Pull-Up switch, a Discrete High switch, a Discrete Low switch, a positive 15 volt switch, a negative 15 volt switch, a range switch, and a voltage out switch.

20. A PLC in accordance with claim 18 wherein said processor determines a configuration of one of the switches.

21. A PLC in accordance with claim 16 wherein said processor is configured to send a message corresponding to the output via an input/output bus.

22. A PLC in accordance with claim 21 wherein the message includes one of an absence of a back biased power at said at least one connector pin and a presence of the back biased power at said at least one connector pin.

23. A method for configuring at least one connector pin utilizing a control circuit, the control circuit including at least one port, said method comprising:
providing an energization state to the at least one port;
controlling a configuration of the at least one connector pin by utilizing a processor including the at least one port;
providing an output from a comparator to the processor located within the control circuit; and
coupling an input of the comparator to a plurality of switch assemblies including switches and voltage supplies, the switch assemblies configured to operate the at least one connector pin in one of a plurality of modes.

24. A method in accordance with claim 23 wherein one of the at least one port is configured to be one of a Pull-Down (PD) port, a Pull-Up (PU) port, a Discrete High (DH) port, a Discrete Low (DL) port, a positive 15 volt (P15V) port, a negative 15 volt (N15V) port, a range (RANGE) port, and a voltage out (VOUT) port.

25. A method in accordance with claim 23, said method further comprising:
utilizing the energization state of the at least one port to control whether one of the switches is in an open state or a closed state; and
controlling a configuration of the at least one connector pin by utilizing one of the open and closed states of one of the switches.

26. A method in accordance with claim 25 wherein one of the switches is configured to be one of a Pull-Down switch, a Pull-Up switch, a Discrete High switch, a Discrete Low switch, a positive 15 volt switch, a negative 15 volt switch, a range switch, and a voltage out switch.

27. A method in accordance with claim 23 further comprising transmitting a message corresponding to the output via an input/output bus.

28. A method in accordance with claim 27 wherein said transmitting a message comprises sending a message that includes one of an absence of a back biased power at said at least one connector pin and a presence of the back biased power at said at least one connector pin.

29. An I/O module comprising:
at least one connector pin;
a control circuit comprising:
a processor controlling a configuration of said at least one connector pin by operating a plurality of switches; and
a comparator configured to provide an output to said processor located within said circuit, wherein an input of said comparator is coupled to a plurality of switch assemblies including said switches and voltage supplies, said switch assemblies configured to operate said at least one connector pin in one of a plurality of modes.

30. An I/O module in accordance with claim 29 wherein said processor is configured to send a message corresponding to the output via an input/output bus.

31. An I/O module in accordance with claim 30 wherein the message includes one of an absence of a back biased power at said at least one pin and a presence of the back biased power at said at least one pin.

32. An I/O module comprising:
at least one connector pin;
a control circuit comprising a processor that operates a plurality of switches to control a configuration of said at least one pin, wherein the configuration is one of a twenty-four volt positive logic discrete input mode, a twenty-four volt negative logic discrete input mode, a twenty-four volt high side discrete output mode without open wire detection, a twenty-four volt high side discrete output mode with open wire detection, zero volt low side discrete output mode without open wire detection, a zero volt low side discrete output mode with open wire detection, zero to ten volt analog input mode, and a zero to ten volt analog output mode; and
a comparator configured to provide an output to said processor, wherein a first input of said comparator is coupled to a plurality of switch assemblies including said switches and voltage supplies, a second input of said comparator counted to a digital to analog converter that receives a reference signal from said processor, said switch assemblies configured to operate said at least one connector pin in one of a plurality of modes.

33. An I/O module in accordance with claim 32 wherein to operate said switches said processor controls a configuration of a respective at least one switch.

34. An I/O module in accordance with claim 32 wherein said processor is configured to send a message corresponding to the output via an input/output bus.

35. An I/O module in accordance with claim 34 wherein the message includes one of an absence of a back biased power at said at least one pin and a presence of the back biased power at said at least one pin.

36. A method for configuring at least one connector pin utilizing a control circuit, said method comprising:

controlling a configuration of the at least one connector pin, wherein the configuration is one of a twenty-four volt positive logic discrete input mode, a twenty-four volt negative logic discrete input mode, a twenty-four volt high side discrete output mode without open wire detection, a twenty-four volt high side discrete output mode with open wire detection, a zero volt low side discrete output mode without open wire detection, a zero volt low side discrete output mode with open wire detection, a zero to ten volt analog input mode, and a zero to ten volt analog output mode;

providing an output from a comparator to a processor located within the control circuit;

coupling a first input of the comparator to a plurality of switch assemblies including a plurality of switches and voltage supplies, the switch assemblies configured to operate the at least one connector pin in one of a plurality of modes; and coupling a second input of the comparator to a digital to analog converter that receives a reference signal from the processor.

37. A method in accordance with claim 36 wherein the control circuit includes at least one port, said method further comprising providing an energization state to the at least one port to control a configuration of the at least one connector pin.

38. A method in accordance with claim 37 said method further comprising:

utilizing the energization state of the at least one port to control whether one of the switches is in an open state or a closed state; and controlling a configuration of the at least one connector pin by utilizing one of the open and closed states of one of the switches.

39. A method in accordance with claim 38 wherein one of the switches is configured to be one of a Pull-Down switch, a Pull-Up switch, a Discrete High switch, a Discrete Low switch, a positive 15 volt switch, a negative 15 volt switch, a range switch, and a voltage out switch.

40. A method in accordance with claim 36 further comprising transmitting a message corresponding to the output via an input/output bus.

41. A method in accordance with claim 40 wherein said transmitting a message comprises sending a message that includes one of an absence of a back biased power at said at least one connector pin and a presence of the back biased power at said at least one connector pin.

* * * * *